United States Patent [19]

Izumi et al.

[11] Patent Number: 4,752,129
[45] Date of Patent: Jun. 21, 1988

[54] WAVELENGTH MODULATION DERIVATIVE SPECTROMETER

[75] Inventors: Takusuke Izumi, Tokyo; Akihiko Nagai, Atsugi; Seiji Kanai, Ebina; Tsuneo Suzuki, Atsugi, all of Japan

[73] Assignee: Anritsu Corporation, Tokyo, Japan

[21] Appl. No.: 840,943

[22] Filed: Mar. 18, 1986

[30] Foreign Application Priority Data

Mar. 27, 1985 [JP] Japan .................. 60-62341
Mar. 27, 1985 [JP] Japan .................. 60-62342
Dec. 10, 1985 [JP] Japan .................. 60-275967

[51] Int. Cl.$^4$ .............................. G01J 3/18
[52] U.S. Cl. ............................. 356/328; 331/156; 331/183
[58] Field of Search .............. 331/156, 157, 183; 250/372, 373; 356/307, 308, 326, 328, 329, 330, 332, 334; 324/56; 350/6.5, 6.6, 269

[56] References Cited

U.S. PATENT DOCUMENTS

| 1,951,666 | 3/1934 | Martin | 172/292 |
| 3,621,467 | 11/1971 | Dostad | 331/109 |
| 3,713,045 | 1/1973 | Usuda et al. | 331/109 |
| 4,211,486 | 7/1980 | Magnussen, Jr. et al. | 356/328 |
| 4,441,815 | 4/1984 | Izumi | 356/328 |

FOREIGN PATENT DOCUMENTS 0138206 10/1981 Japan .................. 356/375

OTHER PUBLICATIONS

J. W. Strojek et al., "Derivative Spectrophotometry:...", Analytical Chemistry (Jun. 1975).
G. Bonfiglioli et al., "Self Modulating, Derivative Optical Spectroscopy", Applied Optics (Mar. 1967).
"Analytical Chemistry", vol. 45, 1973; R. N. Hager, Jr., pp. 1131A-1138A.
"J. Phys. E", vol. 14, 1981, T. Izumi and K. Nakamura, pp. 105-112.
"Analytical Chemistry", vol. 53, T. Izumi and K. Nakamura, pp. 782-786, 1981.
"Applied Optics", vol. 22, No. 22, 1983, T. Izumi and N. Takeda, pp. 3618-3621.

Primary Examiner—F. L. Evans
Attorney, Agent, or Firm—Frishauf, Holtz, Goodman & Woodward

[57] ABSTRACT

Light to be measured is input to a diffraction grating after is has been oscillated by a wavelength modulation device with a constant frequency F. The light is incident to the diffraction grating at an angle of incidence, $\theta$, and is oscillated with a frequency F with a center angle of incidence, $\theta_0$, as a center. An output spectrum of said diffraction grating is received by a photoelectric converter. An electric signal from the photoelectric converter is oscillated with a frequency F over a wavelength range of $\lambda_0 \pm \Delta\lambda$ where $\lambda_0$ is a center wavelength measured at the center angle of incidence $\theta_0$. The oscillated spectrum signal is synchronously detected, by a synchronous detector, with a frequency 2F through a high-pass filter, obtaining a variation spectrum at the measured center wavelength $\lambda_0$. The output electric signal of the photoelectric converter passes through a DC amplifier to a sampling circuit where it is sampled with the frequency F or 2F. In this way it is possible to obtain a full intensity of a spectrum at the center wavelength $\lambda_0$. The driving of a wavelength scanning mechanism causes a variation in the incident angle $\theta_0$ of the light to the diffraction grating and thus a variation in the center wavelength $\lambda_0$ measured.

6 Claims, 13 Drawing Sheets

F I G. 7A
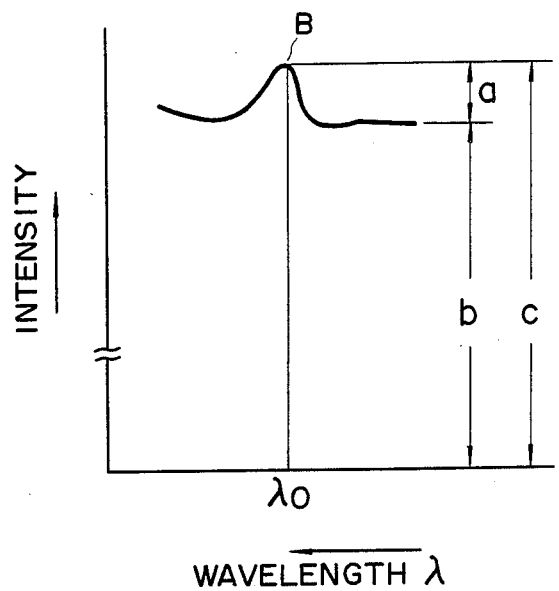
F I G. 7B
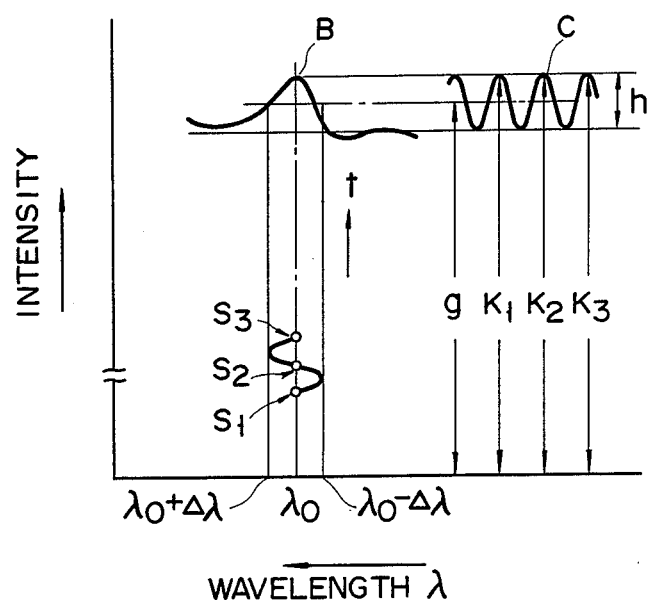

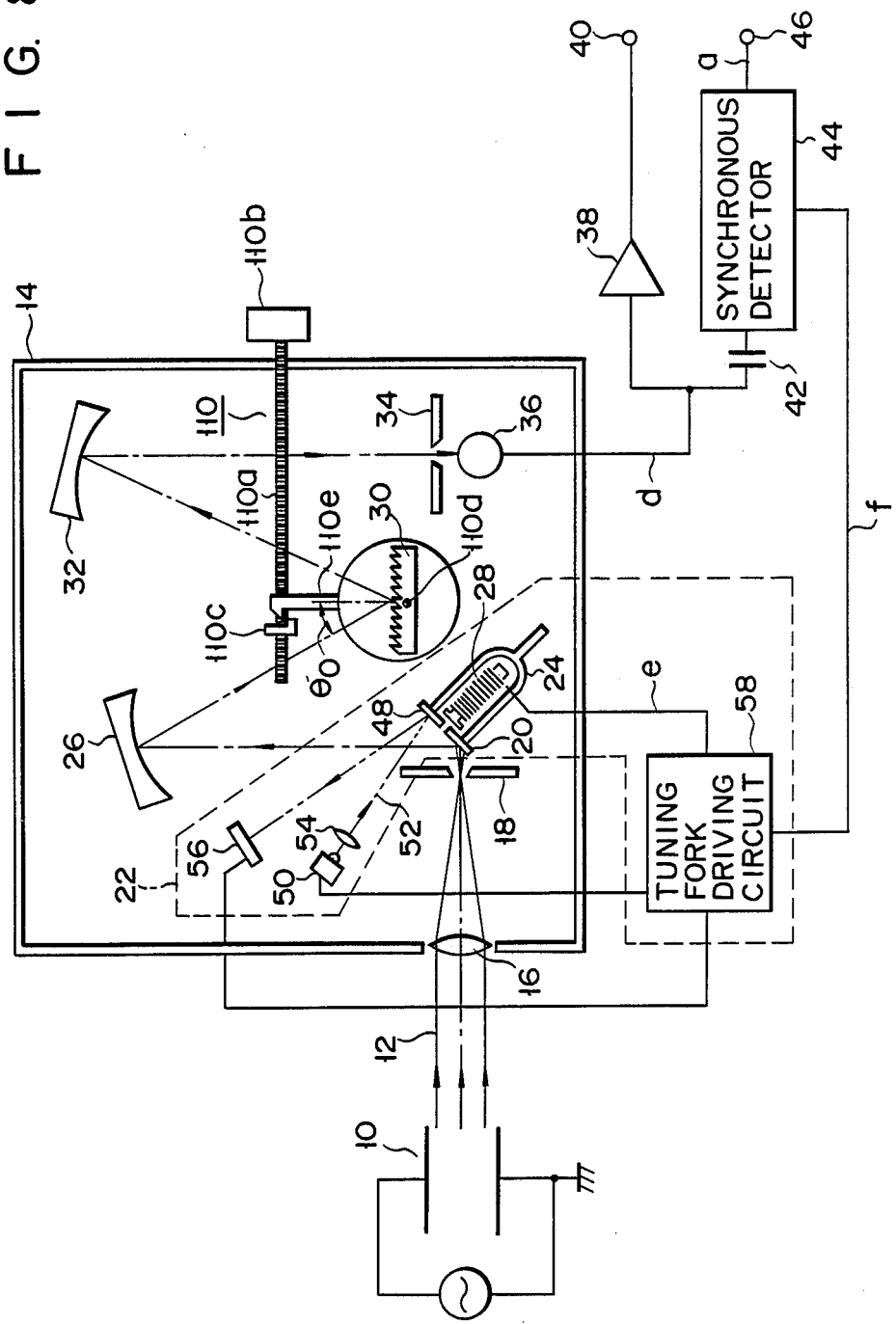

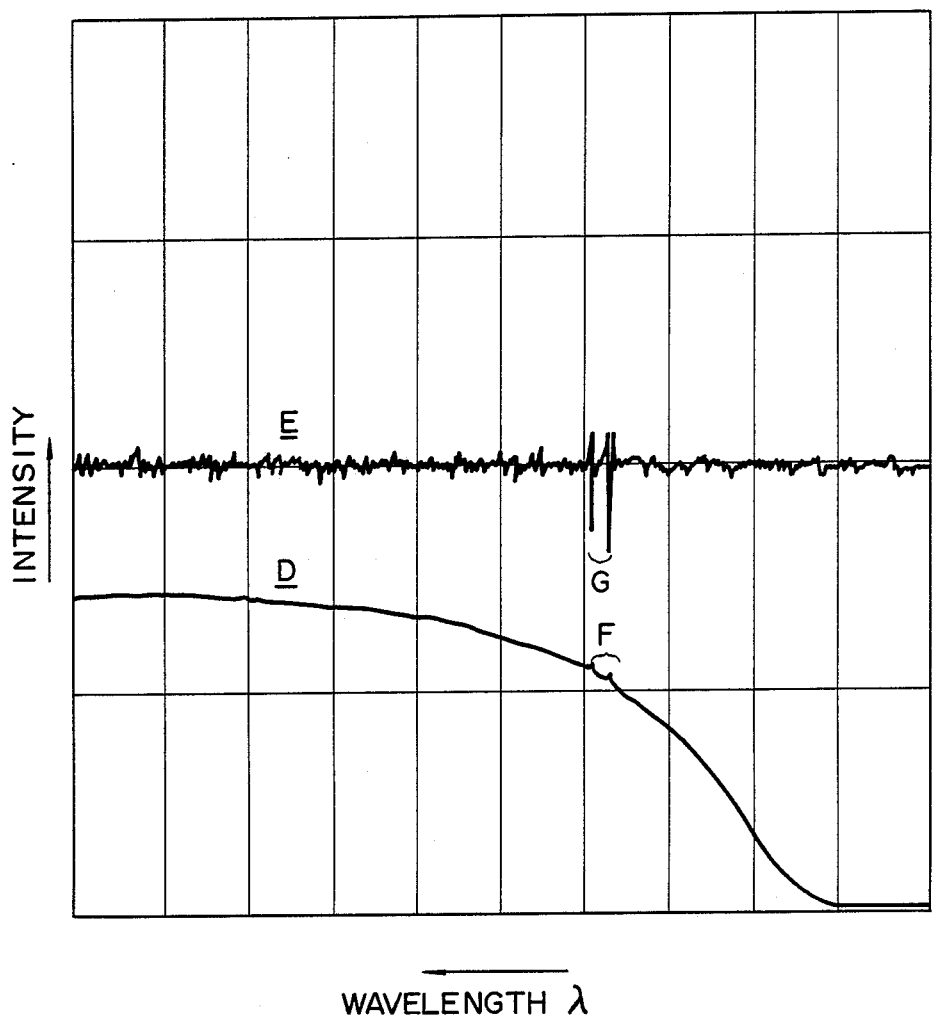

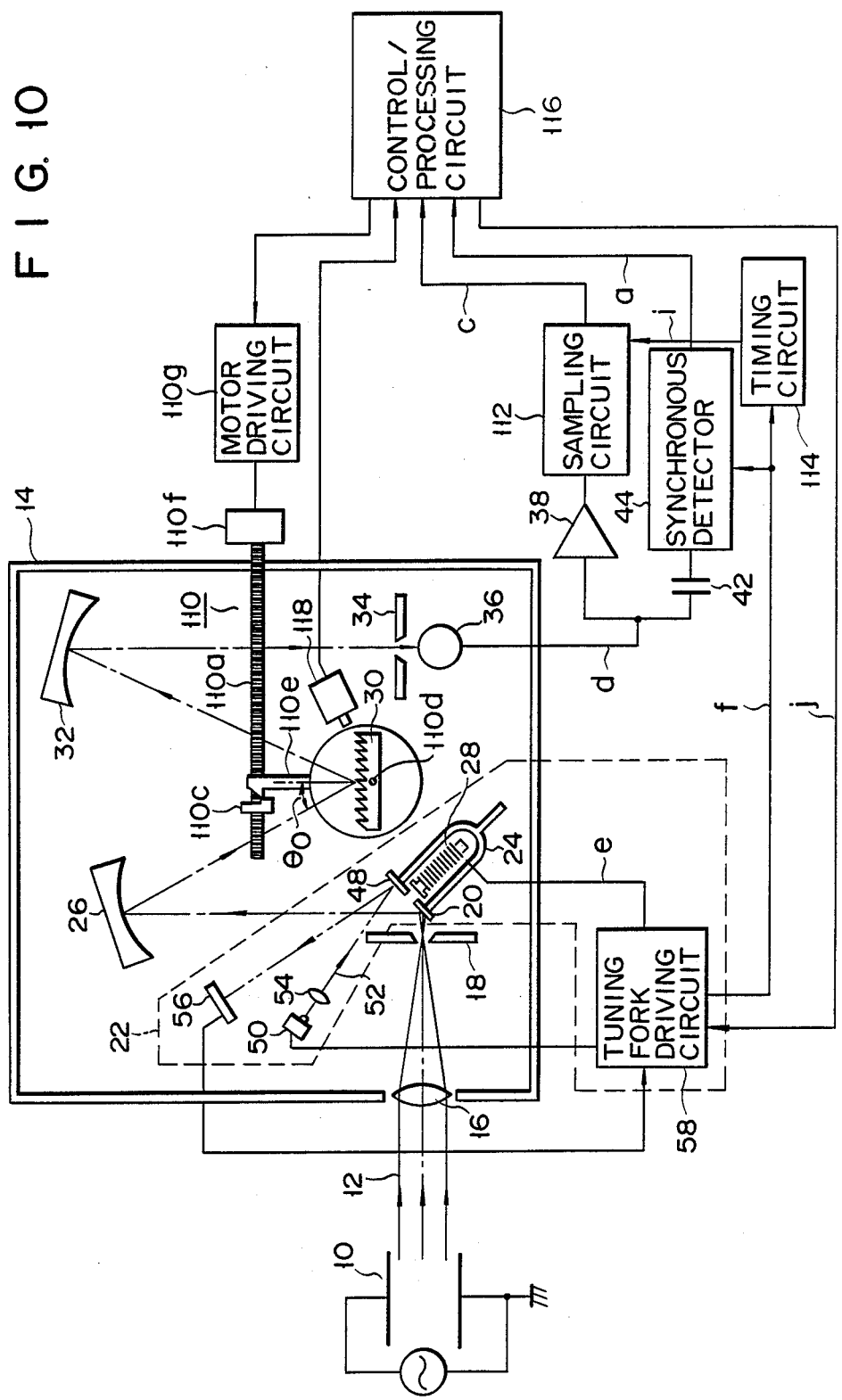

F I G. 14
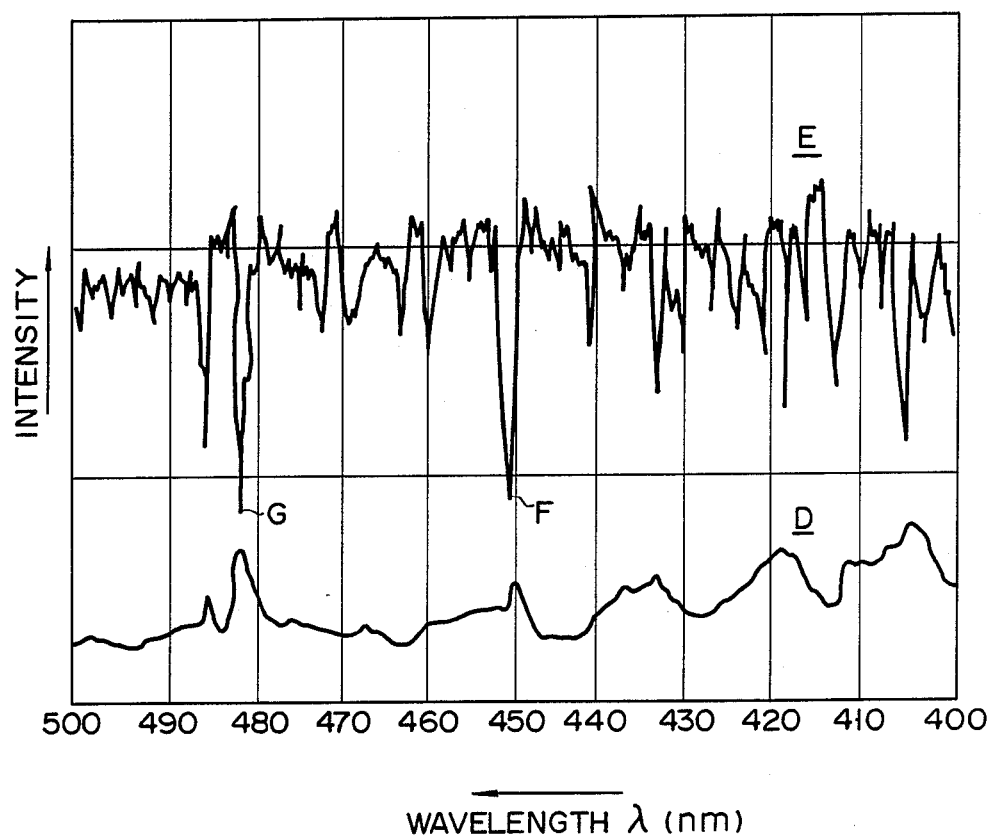

WAVELENGTH MODULATION DERIVATIVE SPECTROMETER

BACKGROUND OF THE INVENTION

This invention relates to a wavelength modulation derivative spectrometer (WAMOS) and, more particularly, to a WAMOS that utilizes a wavelength modulation device to judge the completion of a process such as plasma etching in the manufacture of, for example, IC elements.

In the process of manufacturing semiconductor IC elements, use is made, as a means of detecting completion of such processes as plasma etching, plasma ashing or reactive ion etching, of a means that detects a variation in the plasma spectrum of the substance being processed. Where an aluminum wiring pattern for, for example, IC elements is formed by plasma etching, measurement is made of the plasma spectrum emitted from the substance during the etching process. FIG. 1A is a spectrum (direct spectrum) diagram based on the results of a conducted measurement. A prominent emission line spectrum, as exemplified by A (308.2 nm) in FIG. 1A, is a typical find among the spectral characteristics measured. With emission line spectrum A as a target spectrum, spectrometer detection wavelength $\lambda$ is fixed to center wavelength $\lambda_0$ of the emission line spectrum to permit the intensity of emission line spectrum A to be measured continuously. The etching process is terminated when emission line spectrum A varies, as shown in FIG. 1B, greatly, this being regarded as an etching completion time.

Generally, the plasma spectrum characteristics normally contains spectra having various wavelengths emitted from substances other than the target substance. That is, disturbed spectra deriving from these substances overlaps the target spectrum, thus there being no possibility that correct measurement will be made of the intensity of the target spectrum. A broader spectrum and a linear pattern of emission line spectrum are mingled in the disturbed spectrum. It is therefore necessary that, in a range between the etching process time and the etching completion time, outstanding emission line spectra of greater intensity be found from among the whole range of spectral characteristics.

Upon comparison between the spectral characteristic at the etching process time in FIG. 1A and that at the etching completion time at FIG. 1B an emission line spectrum B is found in the neighborhood of 400.0 nm. As a result, the etching process time can be detected by matching the detection wavelength $\lambda$ of the spectrometer to the center wavelength $\lambda_0$ of the emission line spectrum B and detecting a variation in the intensity of the spectrum B.

In the aforementioned continuous measurement of the variation in the intensity of the emission line spectrum B with the detection wavelength $\lambda$ of the spectrometer fixed at $\lambda_0$ to detect the plasma etching completion time, however, the following drawbacks are encountered.

That is, the emission line spectrum B at the wavelength $\lambda_0$ is often found to overlap a broader range of background spectrum.

With the full intensity of a whole emission line spectrum, that of the background spectrum and that of a variation, projected from the background spectrum, represented by c, b and a, respectively, it is necessary to measure a variation in the intensity a finally so that the completion of etching may be detected. In actual practice, the full intensity c of the emission line spectrum containing the background spectrum intensity b is measured by the spectrometer.

In general, the accuracy with which the intensity of the spectrum is measured by the spectrometer is on the order of 0.1% at most. Consequently, with the intensity a of the detection spectrum set smaller than the intensity b of the background spectrum, it has not been possible in this field of art to precisely measure such a variation intensity a.

In the plasma etching process of semiconductor IC elements, when the value of the intensity a ceases to be detected as shown in FIG. 1B, this aspect is judged as being an etching process completion time. If in this case the value of the intensity a cannot be accurately measured as set forth above, the intensity a is judged as reaching zero, in spite of the fact that the etching step has not yet been completed, sometimes resulting in the interruption of the etching process. Since in this case some area of the semiconductor surface is left unetched, there is a possibility that a lower yield will result in the manufacture of semiconductor IC elements.

SUMMARY OF THE INVENTION

This invention is contrived in consideration of these circumferences and has as its object to provide a wavelength modulation derivative spectrometer (WAMOS) in which, even if the intensity of the background spectrum is greater, a minute variation in a target emission line spectrum, an absorption spectrum peak, etc. can accurately be measured with a better response characteristic.

Another object of this invention is to provide a WAMOS which can measure an absolute value of a spectrum, readily identify a target emission line spectrum and properly find its variation.

According to one embodiment of this invention there is provided a wavelength modulation derivation spectrometer, which comprises:

a wavelength modulation device for oscillating tobe-measured light with a predetermined frequency;

a diffraction grating for dispersing the light modulated by the wavelength modulation device and producing an output as a diffraction spectrum;

a photoelectric converter for receiving the diffraction spectrum from the diffraction grating and converting a light modulated component of the diffraction spectrum to an electric signal; and a synchronous detector for permitting the electric signal output from the photoelectric converter to be synchronously detected with double an oscillation frequency of the wavelength modulation device to obtain a variation intensity corresponding to a spectrum variation superimposed on a greater background spectrum.

According to another embodiment of this invention, the aforementioned WAMOS is provided which further includes a wavelength scanning mechanism which rotates a diffraction grating to continuously vary an incident angle at which light modulated by a wavelength modulation device is incident on the diffraction grating.

According to another embodiment of this invention, there is provided the aforementioned WAMOS which further includes:

a DC amplifier for amplifying an electric signal output from the photoelectric converter; and a sampling circuit for sampling an output signal of the DC amplifier in synchronism with an oscillation frequency of an oscillation element or double the oscillation frequency and for finding a full intensity of a spectrum superimposed on a greater background spectrum.

BRIEF DESCRIPTION OF THE DRAWINGS

FIGS. 7A and 7B are views for explaining an operation principle;

FIG. 8 is a diagrammatic view showing a whole arrangement of another embodiment of this invention;

FIG. 9 is a view showing measured levels obtained by a WAMOS as shown in FIG. 8;

FIG. 10 is a view showing a WAMOS according to another embodiment of this invention;

FIG. 14 is a graph showing measured values obtained by the WAMOS in FIG. 10;

DETAILED DESCRIPTION OF THE PREFERRED EMBODIMENTS

The embodiments of this invention will now be described below in more detail with reference to the accompanying drawings.

Figure 2:
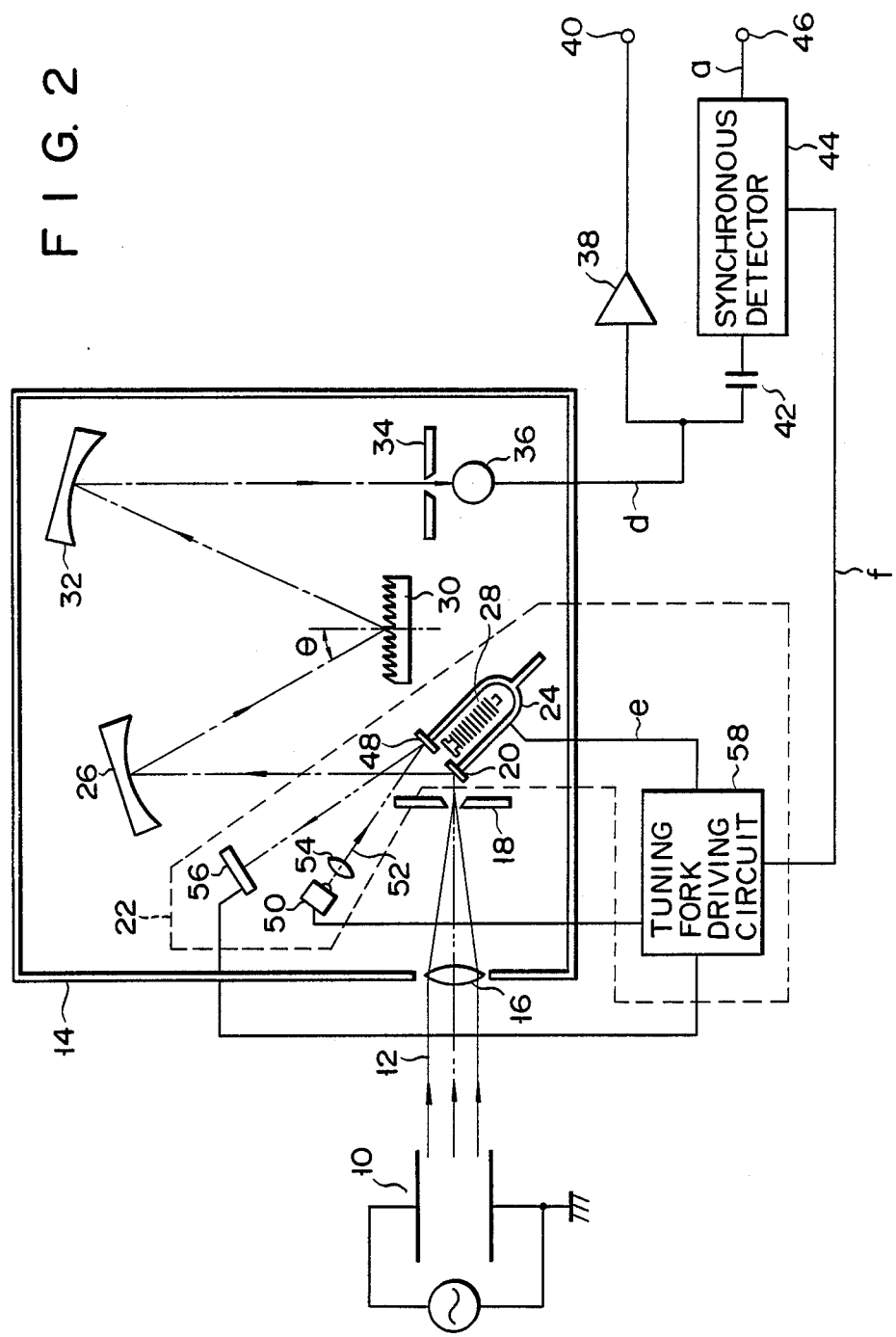
FIG. 2 is a schematic diagram showing a wavelength modulation derivative spectrometer (WAMOS) according to one embodiment of this invention.

FIG. 2 is a diagrammatic view showing a wavelength modulation derivative spectrometer (WAMOS) according to one embodiment of this invention. During the manufacture of semiconductor IC elements, etc., light 12 to be measured is emitted from plasma generating source 10 of, for example, an etching process unit. Light 12 is condensed onto entrance slit 18 and entered through the entrance slit onto first plane mirror 20 with the use of condensing lens 16 fitted in an entry window of casing 14. First plane mirror 20 is mounted on one of a pair of oscillating sections of oscillating element 24 constituting one member of wavelength modulation unit 22.

An explanation will be made of the spectrometer with wavelength modulation unit 22 and oscillation element 24 regarded as an tuning fork oscillator and U-shaped tuning fork, respectively. Light 12 entered on plane mirror 20 is reflected there and is incident on collimator 26. U-shaped tuning fork 24 is oscillated by electromagnetic coil 28 with a predetermined frequency F and predetermined amplitude W determined by the shape, weight, etc. of the tuning fork, noting that coil 28 is placed inside the tuning fork. As a result, light 12 reflected on first plane mirror 20 becomes an oscillatory turning light polarized with a predetermined frequency and amplitude.

Oscillation light which has been reflected on collimator 26 is incident onto blaze type diffraction grating 30 where a spectral component of a wavelength determined by the dimension of the diffraction grating is taken out and enters onto collector 32. Exit slit 34 is located in a position onto which the spectral component from collector 32 is imaged. Photoelectric convertor 36 is located adjacent to the rear surface of exit slit 34 and adapted to receive the spectral component, which as been reflected on collector 32 and passed through exit slit 34, and convert it to an electric signal d.

As set out above, since the light incident onto diffraction grating 30 is light whose incident angle is oscillated, the light of the spectrum corresponding to a spectral component obtained through the diffraction grating is also oscillated. The light passing through exit slit 34 is wavelength modulated with the predetermined frequency so that the amplitude of the wavelength modulation has a magnitude bearing a correlation to the oscillation amplitude of U-shaped tuning fork 24.

Photoelectric converter 36 delivers the electric signal d containing DC and AC components to DC amplifier 38 where it is amplified and coupled to output terminal 40. If the signal from output terminal 40 is sampled with the oscillation frequency F and oscillation frequency 2F of U-shaped tuning fork 24, then it is possible to obtain a full intensity c (FIG. 1A) of the emission line spectrum to be measured. The electric signal d of photoelectric converter 36 is also supplied to the high-pass filter, comprised of a capacitor 42, where its DC component is eliminated. The resultant AC component is supplied to synchronous detector 44 where it is synchronously detected with an oscillation frequency 2F of tuning fork oscillator 22. As a result, a variation intensity a of the spectral component to be measured is delivered from synchronous detector 44 to output terminal 46.

In the aforementioned tuning fork oscillator 22, second plane mirror 48 is mounted on the other section of U-shaped tuning fork 24. Light emission device 50 is comprised of a light emitting element, such as an LED, and delivers detection light 52 through a condensing lens 54 to second plane mirror 48 where it is reflected. This reflected light 52, like the oscillation light reflected on first reflection mirror 20, becomes oscillation light of a predetermined frequency F. The reflected light 52 is supplied to amplitude measuring device 56, comprised of a position sensor, etc., where an oscillation amplitude thereof is measured. The oscillation amplitude signal is supplied to oscillation element driving circuit 58 (tuning fork driving circuit in this case) which supplied a drive signal e for driving electromagnetic coil 28 incorporated inside the U-shaped tuning fork 24. Oscillation element driving circuit 58 supplies a synchronizing signal f of a frequency 2F to synchronous detector 44. Another output of oscillation element driving circuit 58 is also supplied to light emission device 50 to permit lighting control.

Condensing lens 54 is a lens which permits the spot of detection light 52 which is emitted from light emission device 50 to be made minimal on the surface of amplitude measuring device 56.

Figure 3:
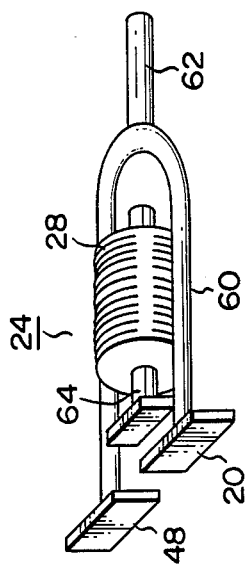
FIG. 3 is a perspective view showing a U-shaped tuning fork as used in the WAMOS of FIG. 2.

FIG. 3 is a perspective view showing a general arrangement of U-shaped tuning fork 24. Tuning fork 24 has a pair of legs or oscillation sections 60 made of a piano wire of, for example, about 2 mm in outer diameter and section 62 made of a piano wire of the same dimension. The leg 60 has a length of about 30 mm and leg-to-leg width of about 10 mm. First and second plane mirrors 20 and 48 mounted on the free ends of the tuning fork section 60 are 7 mm×5 mm in dimension. Electromagnetic coil 28 is turned on core 64 which is located within the U-shaped configuration of the tuning fork 24. The oscillation frequency F of U-shaped tuning fork 24 is determined by, for example, the shape and material of the legs 60. If this dimension is adopted, the oscillation frequency F is about 2 KHz.

Figure 4:
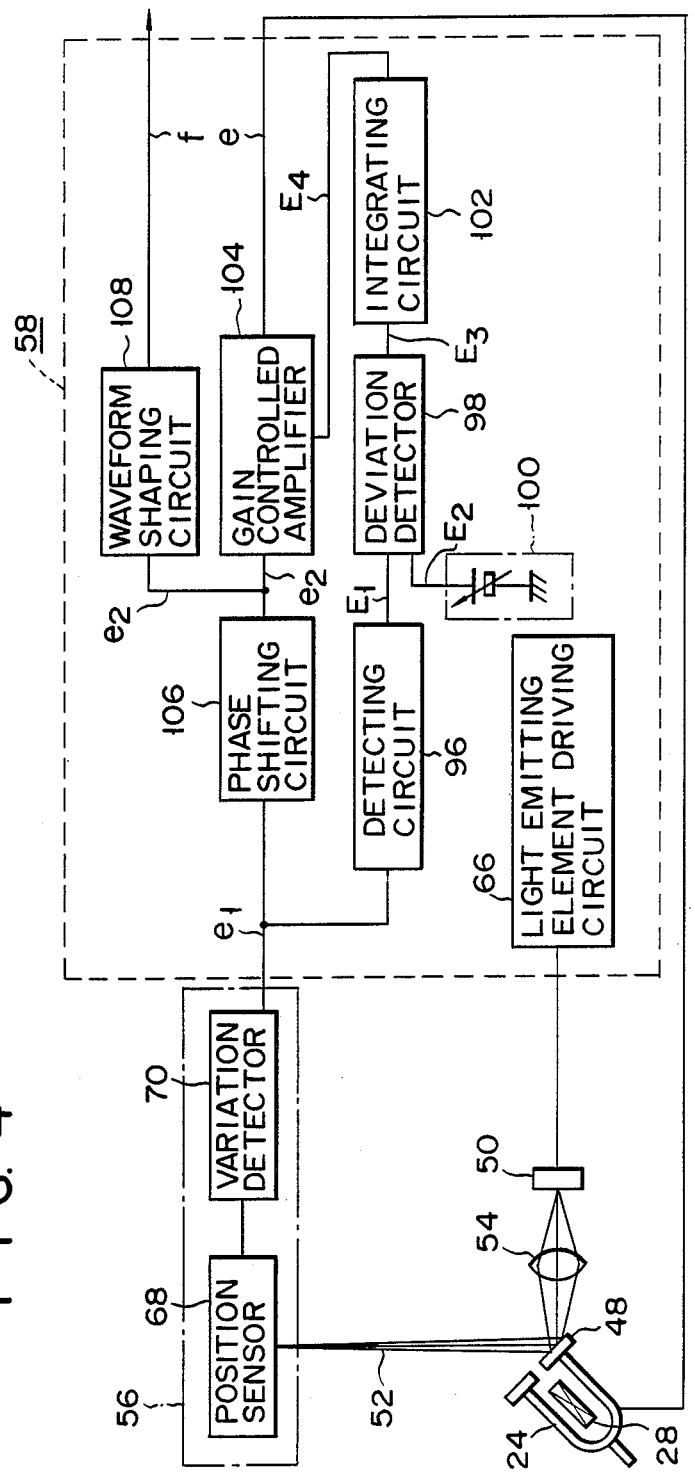
FIG. 4 is a block diagram showing a tuning fork driving circuit.

FIG. 4 is a block diagram showing tuning fork driving circuit 58 for driving U-shaped tuning fork 24 for oscillation. The tuning fork driving circuit includes light emitting element driving circuit 66 for supplying a drive current to a light emitting element, such as an LED, in light emission device 50. Tuning fork driving circuit 58 also includes amplitude measuring device 56 for measuring the amplitude of the oscillation light from second reflection mirror 48 mounted on the free end of one of legs 60 of the U-shaped tuning fork. The amplitude measuring device is comprised of position sensor 68 and variation detector 70. Position sensor 68 is one type of photoelectric converting element for producing an output signal, which is proportional to the movement of an illuminated spot on the sensor, and is adapted to detect the amplitude of detecting light 52, that is, the oscillation amplitude of second plane mirror 48 through a direct illumination spot movement. Position sensor 68 supplies an output signal to variation detector 70 where it is converted to an AC signal $e_1$ as an oscillation amplitude signal varying in accordance with the oscillation of second plane mirror 48.

Figure 5:
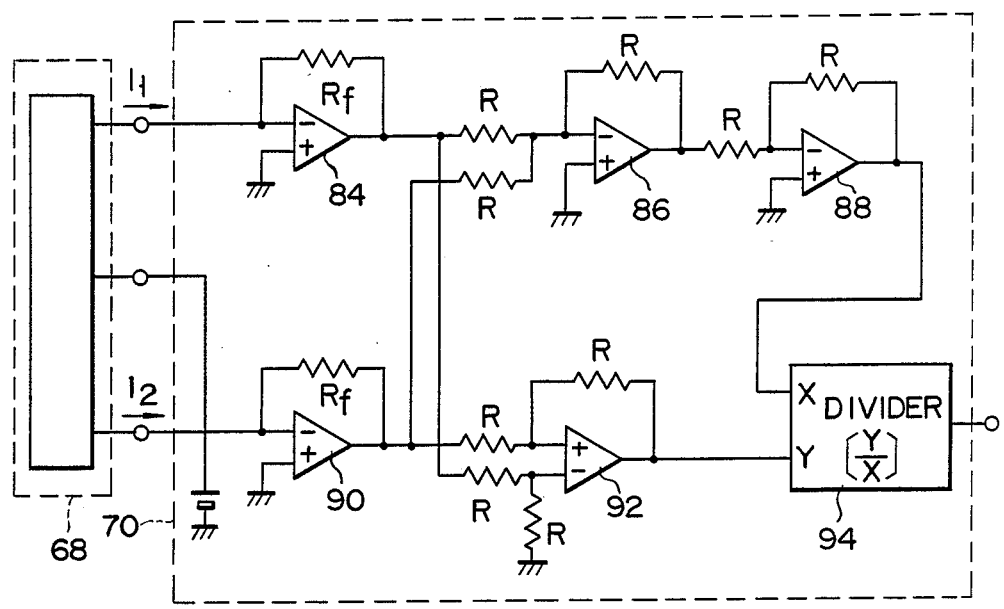
FIG. 5 is a view showing one form of a measuring device for vibrating amplitude of a tuning fork.
Figure 6:
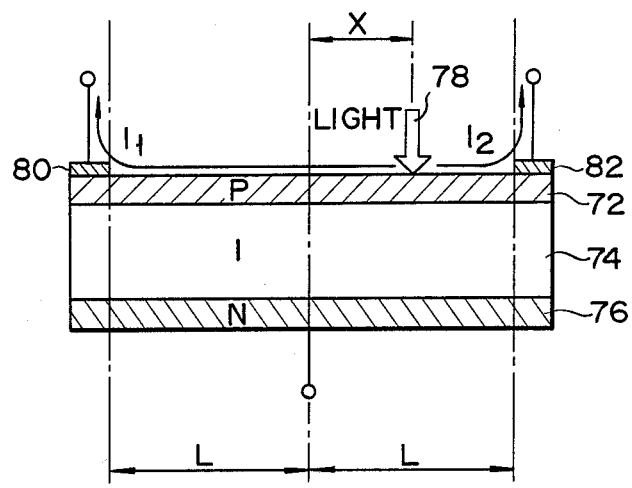
FIG. 6 is a view showing a position sensor.

FIG. 5 shows one form of amplitude measuring device 56. Position sensor 68 is comprised of a semiconductor sensor having P layer 72, I layer 74 and N layer 76 as shown in FIG. 6. Light 78 is incident onto P layer 72 where it is photoelectrically converted to produce photocurrents as separated signals through electrodes 80, 82.

When a light spot is incident on sensor 68, electric charges proportional to light energy are produced in the light incident area. The charges are taken out, as photocurrents, through P layer 72 (resistive layer) and thus through electrodes 80, 82. P layer 72 has a uniform resistive value throughout and such photocurrents are separately taken out in a fashion inversely proportional to their distances (resistive values) up to electrodes 80, 82.

With an electrode-to-electrode distance and photocurrent represented by 2L and $I_0$, respectively, $I_1 = I_0\{(L-X)/2L\}$ $I_2 = I_0\{(L+X)/2L\}$ $I_0 = I_1 + I_2$ $X = L\{(I_2 - I_1)/(I_1 + I_2)\}$ where
 $I_1$ and $I_2$ denote respective output currents from electrodes 80 and 82; and
 X denotes a light incident position.

Using the output current $I_1$ and $I_2$, the light incident position can be found through variation detector 70 comprised of operational amplifiers 84, 86, 88, 90 and 92 and divider 94 as shown in FIG. 5.

Variation detector 70 delivers the AC signal $e_1$, as an oscillation amplitude signal, to tuning fork driving circuit 58 where it is converted by detecting circuit 96 to a DC output voltage $E_1$ as shown in FIG. 4. The output voltage $E_1$ of detecting circuit 96 is supplied to a deviation detector 98, such as a differential amplifier, A setting voltage $E_2$ is also supplied from amplitude setting device 100 to deviation detector 98 where deviation voltage $E_3$ between the DC signal $E_1$ and the setting voltage $E_2$ is produced. The deviation voltage $E_3$ is fed to integrating circuit 102 where it is integrated. The integrated voltage $E_4$ is supplied as a control signal to gain controlled amplifier 104.

On the other hand, the AC signal $e_1$ of variation detector 70 is input to phase shifting circuit 106 where it is matched to the amplitude phase of U-shaped tuning fork 24. The matched signal $e_2$ of phase shifting circuit 106 is delivered to gain controlled amplifier 104 where it is amplified with an amplification factor determined by the control signal voltage $E_4$. The amplified signal is supplied as a drive current e to electromagnetic coil 28 in U-shaped tuning fork 24.

The matched signal $e_2$ is fed to waveform shaping circuit 108 for waveform shaping. Waveform shaping circuit 108 supplies a synchronizing signal f to synchronous detector 44.

In tuning fork driving circuit 58 of such a servosystem, when the amplitude of second plane mirror 48, or output voltage $E_1$ of detecting circuit 96, becomes equal to that of the setting signal $E_2$ of amplitude setting device 100, the deviation voltage $E_3$ of deviation detector 98 falls zero. Consequently, the control signal $E_4$, i.e., the output of integrating circuit 102 reaches a fixed level and thus the oscillation amplitude W of U-shaped tuning fork 24 also reaches a fixed level. If the output voltage $E_1$ of detecting circuit 96 does not become equal to the setting voltage $E_2$ of amplitude setting device 100, a corresponding deviation voltage $E_2$ is supplied to integrating circuit 102. The control signal voltage $E_4$, i.e., the output of integrating circuit 102 varies in accordance with the deviation voltage $E_3$. As a result, the oscillation amplitude W of U-shaped tuning fork 24 is so varied that the output voltage $E_1$ of detecting circuit 96 is made equal to the setting voltage $E_2$ of amplitude setting circuit 100. Thus the oscillation amplitude W of U-shaped tuning fork 24 can be properly varied by varying the setting voltage $E_2$ of amplitude setting circuit 100.

The operation principle of the WAMOS will be explained below with reference with FIGS. 7A and 7B.

With the center wavelength $\lambda_0$ of a to-be-measured emission line spectrum B used as a center, the spectrum intensity is measured, while modulating the wavelength $\lambda$. The spectrum intensity waveform measured becomes a waveform C with an AC component (ripple component) of an amplitude h superimposed on an average DC component g as shown in FIG. 7B. The frequency of the AC component becomes a frequency 2F, i.e., double the wavelength modulation frequency F. If, therefore, the waveform C is detected in synchronism with the wavelength modulation at the frequency 2F, then it is possible to obtain an original spectrum intensity. In actual practice, since a broader-band background spectrum of the intensity b is superimposed on a measured emission line spectrum B as shown in FIG. 7A, if synchronous detection is performed after the DC component g as shown in FIG. 7B has been eliminated through the high pass filter, the amplitude h can be obtained which corresponds to the intensity a of the variation of the emission line spectrum B. If the DC component g is amplified directly by the DC amplifier without being passed through the high-pass filter and then sampled with the frequency F or 2F, it is possible to obtain the full intensity c of the emission line spectrum B.

If this principle is explained in connection with the WAMOS of FIG. 2, light 12 passing through entrance slit 18 is reflected on first plane mirror 20 on one free end of the oscillation section of U-shaped tuning fork 24 and then on collimator 26, and falls onto diffraction grating 30. Since U-shaped tuning fork 24 is oscillated with a predetermined amplitude W and frequency F, light 12 incident onto diffraction grating 30 oscillates within a predetermined angle range ($\theta \pm \Delta\theta$) where $\theta$ denotes an incident angle to diffraction grating 30. As a result, the oscillation spectrum of the wavelength $\lambda_0 \pm \Delta\lambda$ is imaged at exit slit 34 and hence the spectrum formed in the center position of the oscillation spectrum is left from exit slit 34 and becomes a waveform C with the AC component h superimposed onto the DC component g as shown in FIG. 7B. The waveform C is converted by photoelectric converter 36 to electric signal d. The signal d is supplied to synchronous detector 44 after its DC component g has been eliminated through capacitor 42, and is synchronously detected by synchronous detector 44 to produce a DC signal corresponding to a variation intensity a of the emission line spectrum B in FIG. 7A.

The electric signal d is directly amplified by DC amplifier 38 and the output signal of DC amplifier 38 is sampled with the frequency F or 2F to provide a value corresponding to a total strength c of the background intensity b and variation intensity a of the emission line spectrum B.

It is, therefore, possible to eliminate the DC component g and to separate only a variation component h for detection. It is thus possible to eliminate the background intensity b in the emission line spectrum B and to precisely detect only the variation intensity a. According to this measuring method the variation of the background intensity, even if being produced, would not adversely affect the accuracy with which the variation intensity a of the emission line spectrum B is measured. This system can markedly improved the measuring accuracy in comparison with the conventional spectrometric system where the spectrum intensity is directly measured by the value of a to-be-measured wavelength fixed at $\lambda_0$.

In order to obtain the variation intensity a of the emission line spectrum B the signal which has been synchronously detected by synchronous detector 44 needs to be passed through a low-pass filter. According to experiments conducted by the inventors, in order to maintain the S/N ratio of a measured variation intensity a at more than a predetermined level, the value of a time constant $\tau$ for the low-pass filter should be set to be so great as obtain a relation of more than $$\tau > 200/2F$$

at the lowest with respect to a synchronizing detection frequency 2F. In order to quickly detect a point in time at which the plasma etching of the aforementioned semiconductor IC element is completed, it is necessary that the aforementioned time constant $\tau$ be made as small as possible. It is therefore necessary to increase the wavelength modulation frequency F. That is, it is only necessary to increase the oscillation frequency F of first plane mirror 20 on U-shaped tuning fork 24.

A galvanometer type is also known as a device for oscillating a plane mirror with a high frequency. This device presents a durability problem on a continuous run over a longer period of time due to the presence of a rotation shaft and bearing. Furthermore, the oscillation amplitude is difficult to control in a proper way.

As tuning fork oscillator 22 used in the WAMOS of this invention employs, as an oscillation source, U-shaped tuning fork 24 having a shape as shown in FIG. 3 and dimensions as set out above, it is possible to obtain a high oscillation frequency of about 2 KHz as set forth above. Thus, the response characteristic can be improved. Furthermore, the oscillation amplitude W can be measured by second plane mirror 48 and amplitude measuring device 56 such that the oscillation amplitude W of U-shaped tuning fork 24 is normally maintained constant. The oscillation amplitude W can be varied to any proper level. A reduction in reliability of the spectrometer resulting from poor durability will not occur due to the absence of any mechanically movable component parts.

In the WAMOS, the spectrum intensity is measured with the center wavelength $\lambda_0$ of the to-be-measured emission line spectrum B as a center, while modulating the wavelength $\lambda$ in the neighborhood of that waveform. Thus diffraction grating 30 should be so configured that a center angle of incidence, $\theta_0$, can be attained at which the center waveform of the oscillation spectrum imaged on exit slit 34 is matched to the center wavelength $\lambda_0$ of the emission line spectrum B.

FIG. 8 shows an arrangement, similar to that in FIG. 2, of a WAMOS including wavelength scanning mechanism 110 for continuously varying the center angle of incidence, $\theta_0$, of oscillation light to diffraction grating 30. In FIG. 8, identical numerals are employed to designate parts or elements corresponding to those shown in FIG. 2. In this arrangement, if the wavelength $\lambda_0$ of a to-be-measured emission line spectrum B varying at an etching completion time is not initially known, the WAMOS shown in FIG. 8 may also perform a measuring operation for determining the emission line spectrum B.

Figure 1A:
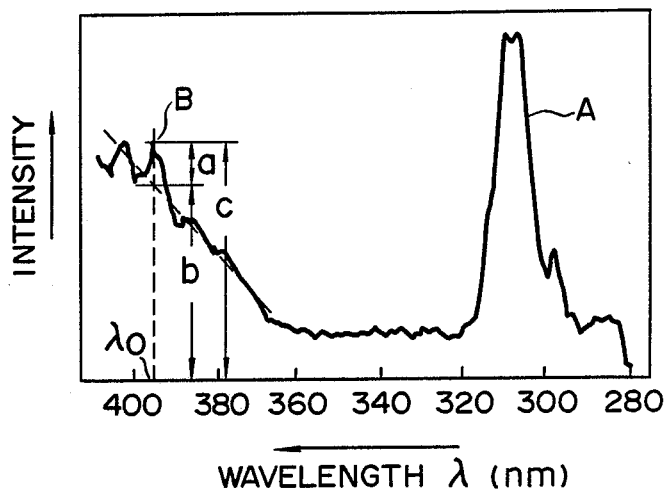
FIGS. 1A and 1B show the plasma spectral characteristics during a plasma etching process, FIG. 1A showing the spectral characteristic at an etching time and FIG. 1B showing the spectral characteristic at an etching process completion time.
Figure 1B:
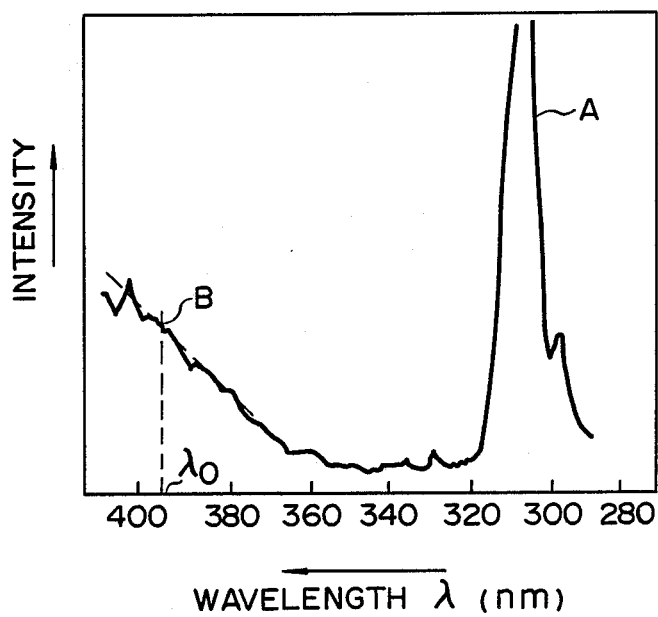

That is, wavelength scanning mechanism 110 is used for rotating diffraction grating 30, rotatably mounted relative to a fixed section, to permit a continuous variation of the center angle of incidence, $\theta_0$, of the oscillation light at which light is incident on diffraction grating 30 from collimator 26. In this wavelength scanning mechanism 110, adjusting knob 110b is mounted on one end of a bar screw 110a, threadably inserted into a threaded hole of a side wall of casing 14, and can be rotated by knob 110b to permit hook member 110c mounted on, and adjacent to, bar screw 110a to be moved in its horizontal position. When hook member 110c is so moved, rotation arm 110e of diffraction grating 30 which is rotatably mounted on rotation shaft 110d relative to the fixed section is moved, permitting the rotation of diffraction grating 30 and thus a variation in the center angle of incidence, $\theta_0$, of the oscillation light. When the center angle of incidence, $\theta_0$, is so varied, the oscillated diffraction spectrum is incident from diffraction grating 30 onto corrector 32 with the center wavelength $\lambda_0$ of that spectrum varied. That is, the rotation of adjusting knob 110b in waveform scanning mechanism 110 permits a sequential shift of the center wavelength $\lambda_0$ of the diffraction spectrum. As a result, it is possible to obtain a broader range of spectrum characteristic as shown in FIGS. 1A and 1B.

FIG. 9 is a graph showing measured levels obtained by the WAMOS of FIG. 8. In the graph shown in FIG. 9, D denotes a spectrum (direct spectrum) obtained through the sampling of an output signal of DC amplifier 38 and E denotes a spectrum (second derivative spectrum) obtained from synchronous detector 44. From this graph it will be appreciated that a greater peak F on the spectrum D is detected as a peak G on the spectrum E.

From the above it will be appreciated that a weak emission line spectrum, which is not observable due to the direct spectrum being masked by the broader background spectrum, can be observed with a better sensitivity by the second derivative spectrum obtained by the WAMOS.

An explanation will be given below about detecting the completion of the plasma etching process by the aforementioned WAMOS during the manufacture of semiconductor IC elements.

That is, the plasma spectrum characteristic as shown in FIG. 1A is found during the etching process which is output through DC amplifier 38 from output terminal 40 by varying the measurement wavelength $\lambda$ by waveform scanning mechanism 110 over a range from a short wavelength to a long wavelength. Then, a similar scanning procedure is also performed to find the plasma spectrum characteristic, as shown in FIG. 1B, at a time at which the etching process is obviously completed. In this way, the most outstanding emission line spectrum B is found among differences between both the characteristics. In wavelength scanning mechanism 110, the measurement wavelength $\lambda$ on the WAMOS is set to the center wavelength $\lambda_0$ of the spectrum B. That is, diffraction grating 30 is so adjusted, by rotating the adjusting knob 110b, that the center wavelength $\lambda_0$ of the oscillated diffraction spectrum incident on collector 32 is matched to the center wavelength $\lambda_0$ of the emission line spectrum B. In this connection it is to be noted that wavelength scanning mechanism 110 has a locking mechanism, not shown in particular, where the wavelength $\lambda_0$ adjusted is locked.

When such a preparation operation is completed, as explained in connection with FIG. 2, the variation intensity a of the emission line spectrum B is continuously measured from a start of the actual plasma etching process, noting that it is output from output terminal 46 through synchronous detector 44. In this case, the time at which that output characteristic level varies to zero is judged as an etching completion time.

In this way, the center wavelength $\lambda_0$ of the emission line spectrum B, even if being unknown, can be found, making it possible to judge the time at which the etching process is completed.

FIG. 10 is a view showing a WAMOS according to another embodiment of this invention. In this embodiment, an output signal d of photoelectric converter 36, which includes DC and AC components, is input to sampling circuit 112 after it has been amplified by DC amplifier 38. Sampling circuit 112 permits the signal d which has been amplified to be sampled with a sampling pulse i of a frequency 2F which is output from timing circuit 114. Timing circuit 114 receives a synchronizing signal f of a frequency 2F from tuning fork driving circuit 58 for driving U-shaped tuning fork 24 in tuning fork oscillator 22. In this case, the frequency 2F of the synchronizing signal f is double the frequency F of U-shaped tuning fork 24. Timing circuit 114 supplies a sampling pulse i to sampling circuit 112 at the time the timing signal f is output. Sampling data of the electric signal d, which is obtained from sampling circuit 112, is supplied as a DC component intensity c of a measurement spectrum to control/processing circuit 116 comprised of a microprocessor, etc., noting that the aforementioned sampling is performed with the frequency 2F.

The electric signal d from photoelectric converter 36 is supplied to synchronous detector 44 after it has been passed through a high-pass filter, comprised of capacitor 42, where a DC component is eliminated. The resultant AC component of the electric signal d is detected, by synchronous detector 44, with the frequency 2F of a synchronizing signal f from tuning fork driving circuit 58, and is supplied as a variation intensity a of the measurement spectrum to control/processing circuit 116.

Control/processing circuit 116 controls motor driving circuit 110g which drives drive motor 110f mounted one end of bar screw 110a of wavelength scanning mechanism 110. The rotation angle of diffraction grating 30 is detected by rotation angle detector 118 and input to control/processing circuit 116.

Control/processing circuit 116 supplies an amplitude setting signal j to tuning fork driving circuit 58 in place of supplying a setting voltage $E_2$ to deviation detector 98 in tuning fork driving circuit 58 in FIG. 4. As a result, tuning fork driving circuit 58 permits a value of a driving current e which is supplied to electromagnetic coil 28 in U-shaped tuning fork 24 to be so controlled that an oscillation amplitude of U-shaped tuning fork 24 which has been calculated from an oscillation amplitude signal from amplitude measuring device 56 is matched to a setting amplitude width W corresponding to the setting signal j. Thus, the oscillation amplitude of U-shaped tuning fork 24 is matched to the amplitude value W corresponding to the setting signal j from control/processing circuit 116. Tuning fork driving circuit 58 sends the synchronizing signal f of a frequency 2F to synchronous detector 44 and timing circuit 114 as set out above, noting that the aforementioned synchronizing signal f has a frequency 2F double the frequency F.

Figure 11:
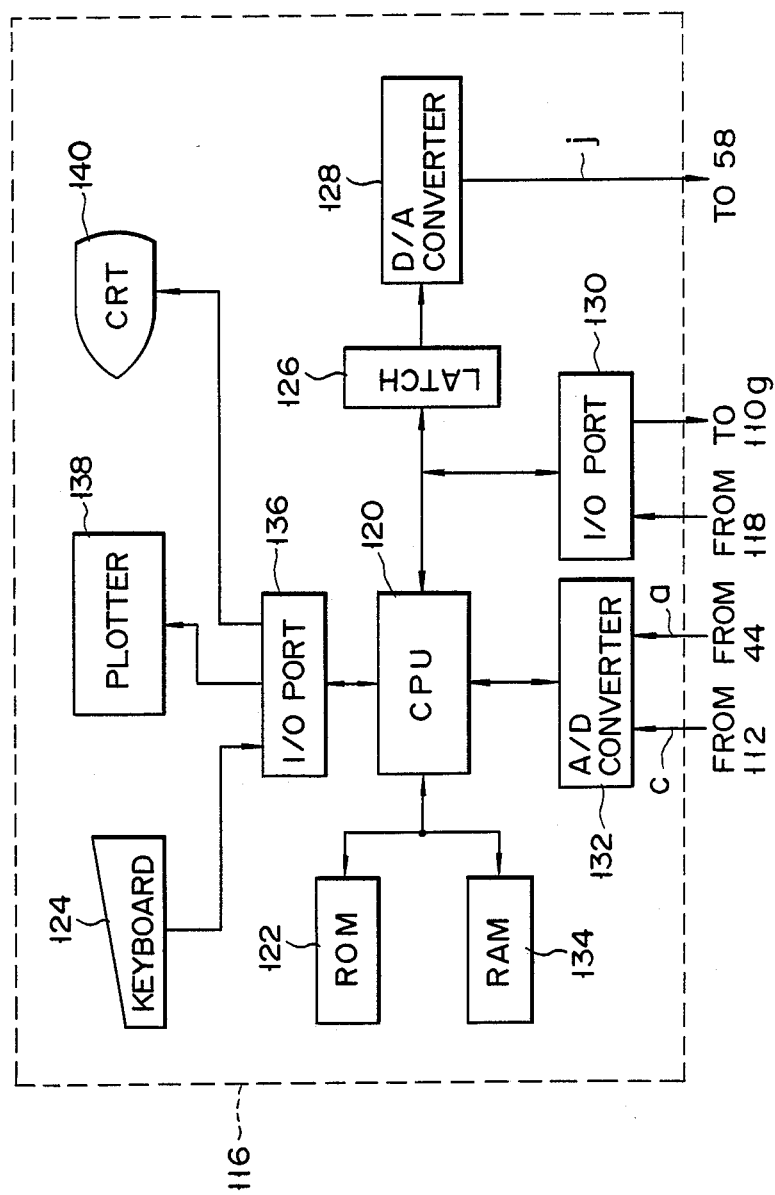
FIG. 11 is a block diagram showing a control/processing circuit for the WAMOS in FIG. 10.
Figure 12:
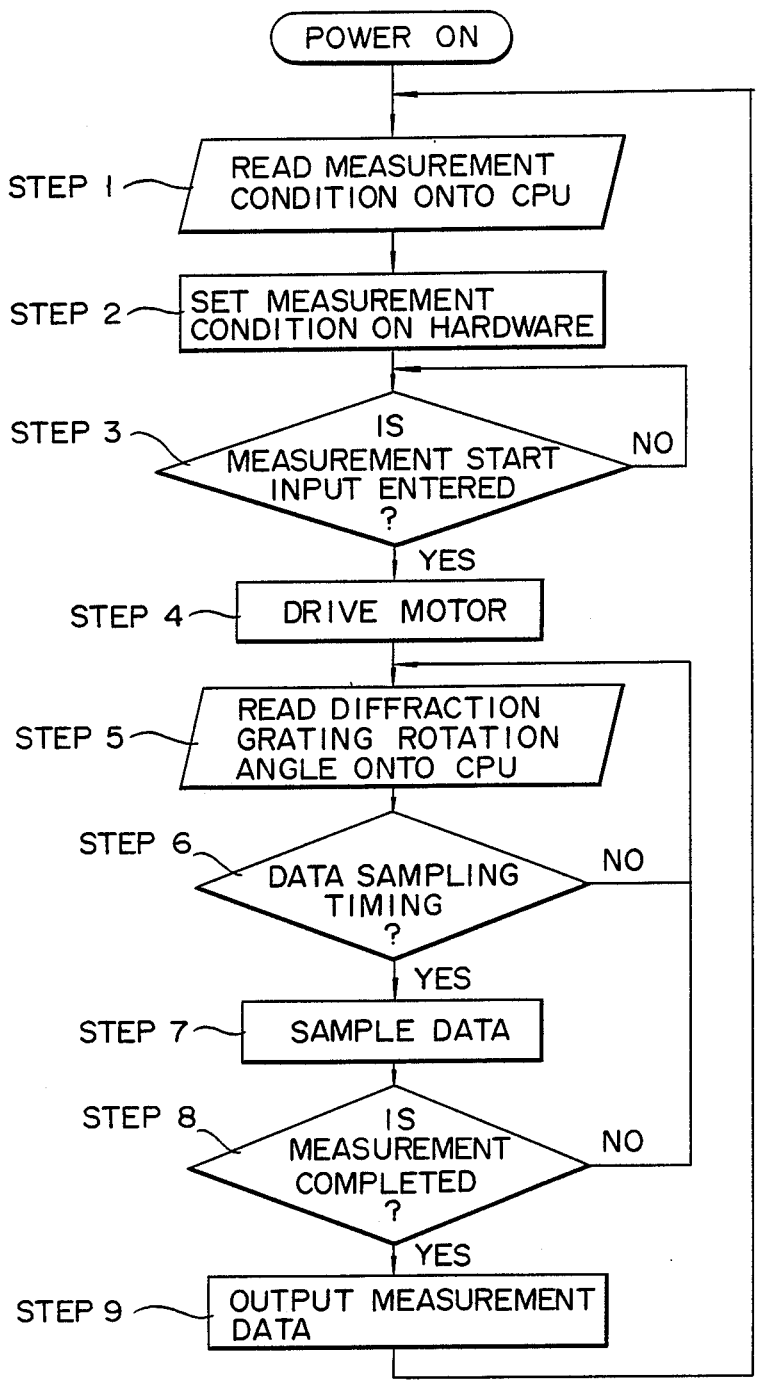
FIG. 12 is a flow chart for explaining the operation of the control/processing circuit of FIG. 11.

FIG. 11 is a block diagram showing control/processing circuit 116 and FIG. 12 is a flow chart of a program which is stored in ROM 122 and run by CPU 120 in FIG. 11. With a power source ON, CPU 120 reads a program from ROM 112 to start a measuring operation step, permitting the measuring conditions to be entered from keyboard 124 (step 1). Here, the measuring conditions are parameters on a modulation amplitude, measuring range, etc. After the measuring conditions have been entered, the associated hardware is set in accordance with the measuring conditions (step 2). For example, a modulation amplitude level is output to latch 126 and transmitted through D/A converter 128 to tuning fork driving circuit 58. When the hardware has been set in accordance with the measuring conditions, CPU 120 is in such a ready state as to permit a measuring operation to be started through keyboard 124 (step 3).

When a measuring operation is started by an inputting operation, diffraction grating 30 is rotated, driving motor 110f (step 4). That is, motor driving circuit 110g is controlled through I/O port 130, supplying a driving signal from motor driving circuit 110g to motor 110f. When diffraction grating 30 starts its rotation, the rotation angle is read from rotation angle detector 118 onto CPU 120 through an I/O port 130 (step 5), permitting determining times $\lambda_1, \lambda_2 \ldots, \lambda_n$ for spectrum data sampling (step 6).

At the sampling time, CPU 120 supplies a conversion signal to A/D converter 132 where analog signals from sampling circuit 112 and synchronous detector 44 are A/D converted to a DC signal which is stored in RAM 134 (step 7). If spectrum data $\lambda_1, \lambda_2, \ldots, \lambda_n$ are wholly not sampled (step 8), the aforementioned steps 5 to 7 are performed in a repetitive fashion. When all the sampling operation is completed, these data are output through I/O port 136 to plotter 138 and CRT 140 (step 9).

In the WAMOS so constructed, the signal d is supplied, after its DC component g has been eliminated through the high-pass filter, to synchronous detector 44, obtaining an intensity corresponding to a variation intensity a of the emission line spectrum B. If the waveform C is sampled with the frequency 2F with the AC component of the amplitude h superimposed thereon, it is possible to derive out an original spectrum intensity. If the waveform C is sampled at times $S_1, S_2, S_3, \ldots$ in FIG. 7B, that is, data $K_1, K_2, K_3, \ldots$ are sampled, it is possible to obtain the original spectrum intensity c. In this connection it is to be noted that the sampling frequency 2F is a frequency corresponding to double the frequency F of U-shaped tuning fork 24 and that the oscillation frequency F of U-shaped tuning fork 24 is of the order of 2 KHz. Since this figure is adequately high compared with the wavelength scanning speed obtained by wavelength scanning mechanism 110, the sampled data of sampling circuit 112 can be regarded as a continuous value relative to a wavelength scanning. This figure, even if being sampled with the sampling frequency F, is adequately high, making it possible to obtain an original spectrum intensity c.

In the WAMOS in FIG. 10, as set out above, U-shaped tuning fork 24 is oscillated with a predetermined frequency F and predetermined amplitude W, and oscillation light incident on diffraction grating 30 is oscillated in a predetermined angle range $\theta_0 \pm \Delta\theta$ with the center angle of incidence, $\theta_0$, as a center where an incident angle 8 is an angle incident onto diffraction grating 30. Consequently, the oscillation spectrum of $\lambda_0 \pm \Delta\lambda$ is imaged onto exit slit 34. Thus the incident light on the surface of photoelectric converter 36 becomes a waveform C in FIG. 7B where the AC component h is superimposed on the average DC component g. The waveform C is converted by photoelectric converter 36 to electric signal d. The signal d whose DC component g is eliminated through capacitor 42 is supplied to synchronous detector 44 where it is synchronously detected with the frequency 2F to produce a DC signal corresponding to a variation intensity a of the emission line spectrum B in FIG. 7.

The sampling circuit 112 samples data with a sampling pulse i (sampling points $S_1, S_2, S_3, \ldots$). The sampled data value becomes a level corresponding to the DC components $K_1, K_2, K_3, \ldots$ in FIG. 7B.

The intensity a of the emission line spectrum B and intensity c corresponding to the DC component are input to control/processing circuit 116.

Figure 13:
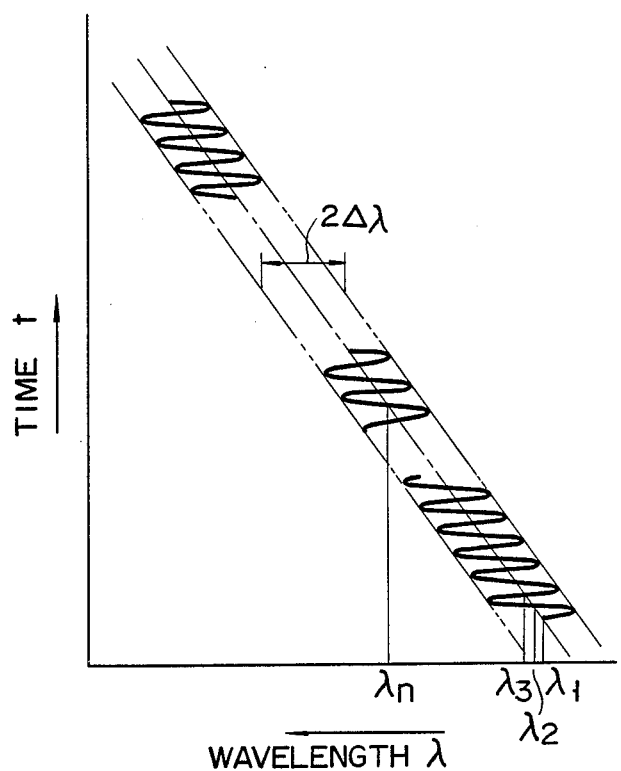
FIG. 13 is a view for explaining the operation of the WAMOS shown in FIG. 10.

When drive motor 110f in motor driving circuit 110g of wavelength scanning mechanism 110 is rotated at a predetermined speed the center wavelength $\lambda_0$ of the diffraction spectrum is sequentially shifted with time t as shown in FIG. 13 and thus the wavelength $(\lambda_0 \pm \Delta\lambda)$ contained in the waveform C in FIG. 7B is also sequentially shifted. Where the waveform C is sampled with a sampling pulse i of the frequency 2F, then the wavelength $\lambda$ corresponding to the sampled data varies with the time t as in the form of $\lambda_1, \lambda_2, \lambda_3, \ldots, \lambda_n$, which is entered into control/processing circuit 116. The rotation angle of diffraction grating 30 coming from rotation angle detector 118, that is, the data on the center waveform $\lambda_0$, is entered onto control/processing circuit 116. The DC intensity c of the spectrum corresponding to the respective length $\lambda$ is entered into control/processing circuit 116.

A sequential variation in the center waveform $\lambda_0$ of the waveform C results in a sequential variation in the wavelength $\lambda$ of the variation intensity a coming from synchronous detector 44.

As a result, two data corresponding to DC intensity c and variation intensity a for the respective wavelength $\lambda$ are simultaneously entered into control/processing circuit 116.

FIG. 14 is an output spectrum from plotter 138 when a reactive ion etching is carried out on an SiO$_2$ film on a semiconductor wafer in the WAMOS. It is thus possible to simultaneously obtain, for the wavelength $\lambda$, a DC characteristic D corresponding to the DC intensity c and a variation characteristic E corresponding to the variation intensity a. As evident from FIG. 14, the variation characteristic E is obtained by differentiating the DC characteristic D twice.

For the variation characteristic E, it is possible to eliminate the DC component g as shown in FIG. 7B and to detect only the AC component for detection. Thus only the variation intensity a can precisely be measured through the elimination of the intensity b of the background spectrum in the emission line spectrum B. It is therefore possible to enhnace the accuracy of measurement in comparison with the case where the spectrum intensity c is directly measured with the value of the measuring wavelength fixed to $\lambda_0$.

In FIG. 14, for example, emission line spectra F and G at the wavelengths $\lambda = 451.0$ nm and $\lambda = 482.0$ nm almost cease to exist at the etching completion time. It is therefore possible to positively detect such emission line spectra by monitoring the variation characteristic E of the emission line spectrum at the aforementioned wavelength.

Since the variation characteristic E and DC characteristics D are simultaneously found, the target value of the emission line spectrum B can be measured, while observing the whole spectrum characteristic. It is thus possible to positively find the variation data of the emission line spectrum B.

Figure 15:
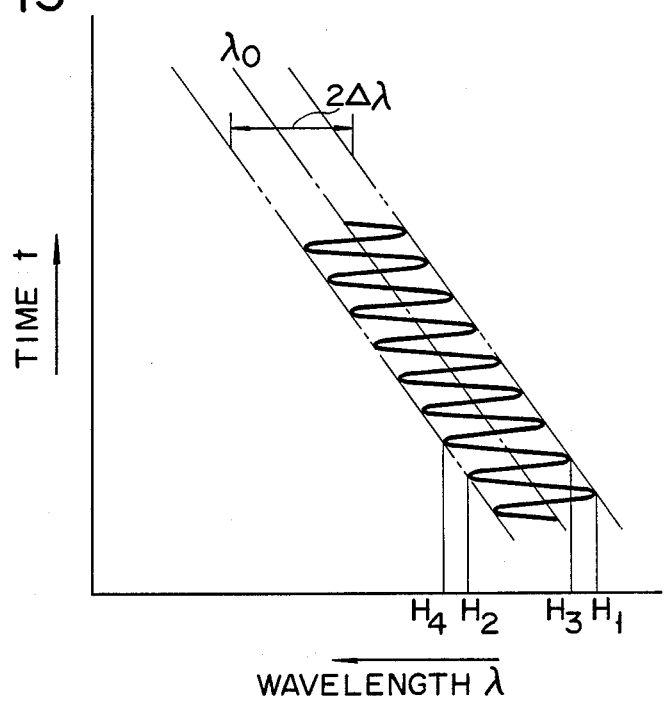
FIG. 15 is a view for explaining the operation of a WAMOS according to another embodiment of this invention.

In the WAMOS of FIG. 10, although the time at which an output of timing circuit 114 is supplied to sampling circuit 112 has been set to the moment at which the variation area of the waveform C crosses the center position indicated by the dot-dash line in FIG. 13, it may be set to the moment at which the variation area of the waveform C reaches maximum and minimum values as shown in FIG. 15. Thus the wavelengths corresponding to the sampled data become the wavelengths $H_1, H_2, H_3, \ldots$ at their folded-back positions. Because the variation $(d\lambda/dt)$ of the data at the folded-back position of the waveform C is smaller, the gate time for sampling can be set to be broader and the accuracy with which the sampled data is measured can be improved.

In this case, the wavelength at the sampling time is such that the center wavelength $\lambda_0$ is displaced by an amount $\pm\Delta\lambda$. The amount $\Delta\lambda$ can be computed from the amplitude W of U-shaped tuning fork 24. It is only necessary to carry out the wavelength correction operation at control/processing circuit 116.

Figure 16:
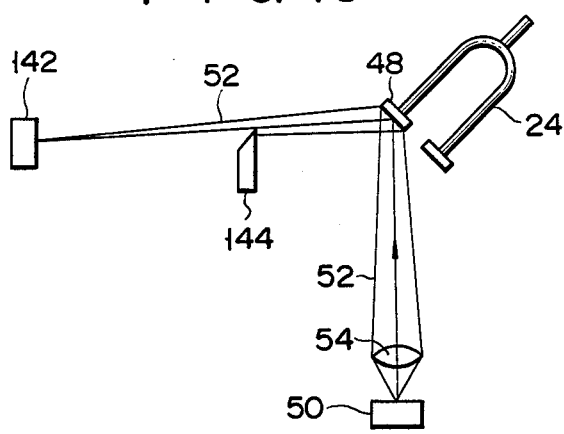
FIGS. 16, 17, 18A and 18B are views showing an oscillation amplitude control mechanism for a tuning fork oscillator.

FIG. 16 is a view showing another form of an oscillation amplitude control mechanism in tuning oscillator 22 of the WAMOS. Detection light 52 which is output from light emission device 50 is reflected on second plane mirror 48 on U-shaped tuning fork 24 and input to light amount detector 142 comprised on a photoelectric converting element and amplifier. Knife edge 144 is located between second plane mirror 48 and light amount detector 142 as set out above to interrupt part of an optical path for detection light 52. Thus an AC component of a light quantity which is detected upon oscillation of U-shaped tuning fork 24 varies in accordance with the amplitude of second plane mirror 48. It is possible to control the oscillation amplitude W of U-shaped tuning fork 24 as in the case of the above-mentioned embodiment.

Figure 17:
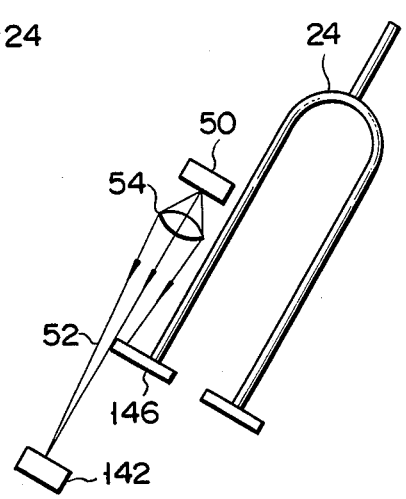

FIG. 17 is a view showing another form of an oscillator amplitude control mechanism of tuning oscillator 22. In this mechanism, knife edge 146 is mounted on the free end of the other section of U-shaped tuning fork 24 in place of second plane mirror 48 which is mounted on the free end of one section of U-shaped tuning fork 24. That is, part of detection light 52 which is incident into light amount detector 142 from light emission device 50 is interrupted by knife edge 146. This mechanism permits a signal corresponding to the oscillation amplitude W of U-shaped tuning fork 24 to be taken out of light amount detector 142.

Figure 18A:
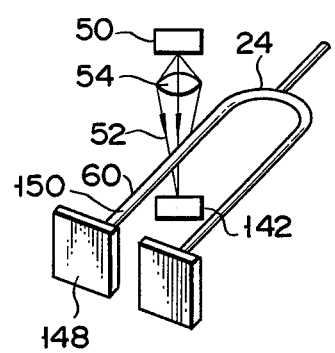
Figure 18B:
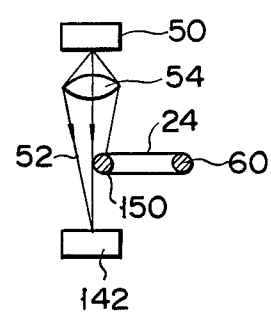

FIGS. 18A and 18B are views showing another form of an oscillation amplitude control mechanism in tuning oscillator 22. In place of second plane mirror 48, one leg or section 150 of U-shaped tuning fork 24 may be used to interrupt a portion of detection light 52 which is incident from light emission device 50 onto light amount detector 142. In place of second plane mirror 48 a dummy mirror 148 is mounted to provide a weight balance. This mechanism permits a signal corresponding to the oscillation amplitude W of U-shaped tuning fork 24 to be taken out of light amount detector 142.

In short, light is used as a means for picking up the amplitude of the U-shaped tuning fork. Conventionally, a variation in a gap between one oscillation section of U-shaped tuning fork 24 and the magnetic head is taken out as an output signal of the magnetic head, but this method is not preferable since a relation of the amplitude to the output signal is largely affected by the ambient temperature.

Figure 19:
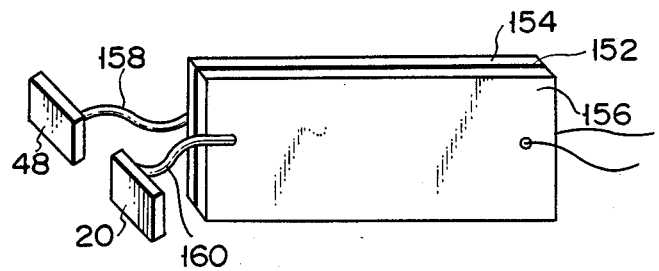
FIG. 19 is a perspective view showing an oscillation element using a piezoelectric actuator as another variant.

Although the WAMOS has been explained in connection with U-shaped tuning fork as an oscillation element, another oscillation element can also be used instead. FIG. 19 is a perspective view showing an oscillation element using a piezoelectric actuator. The oscillation element is comprised of a pair of thin sheets 154, 156 for a pair of piezoelectric elements and metal elastic sheet 152 as a center electrode, in which these sheets each are alternately expanded and compressed in accordance with the polarities of voltage applied thereto. The forward end of that piezoelectric actuator is flexibly displaced in accordance with the polarities of the applied voltage. A pair of arms 158, 160 are fixed at forward ends to the actuator and a pair of plane mirrors 20, 48 are attached to the forward ends of the corresponding arms of the actuator. This construction can obtain the same advantage as in the oscillation element of the U-shaped tuning fork.

The aforementioned WAMOS is used to judge the etching completion time, etc. A variety of changes or modifications can be made without departing from the spirit and scope of this invention. For example, a gas content and liquid concentration can be measured, as in the case of an ammonia analyzer, from a variation in an absorption spectrum of that gas or liquid, using an absorption cell which is located before condensing lens 16.

What is claimed is:

1. A wavelength modulation derivative spectrometer for measuring a variation intensity of a spectrum superimposed onto a greater background spectrum, comprising:
   a wavelength modulation device for oscillating light to be measured with a predetermined frequency comprising
   an oscillation element,
   a plane mirror mounted on an oscillation section of said oscillation element to permit a reflection of the light which is to be measured,
   an oscillation element driving circuit for permitting the light which is reflected from the plane mirror to be oscillated with a predetermined frequency, and
   amplitude measuring means for optically measuring an oscillation amplitude of the oscillated light, in which said oscillation element driving circuit drives said oscillation element so that an amplitude measured by said amplitude measuring means is maintained normally at a constant level;
   a diffraction grating for distributing that light modulated by the wavelength modulation device to produce a diffraction spectrum;
   a photoelectric converter for receiving the diffraction spectrum from said diffraction grating and converting a light-modulated component contained in said diffraction spectrum to an electric signal;
   a synchronous detector for permitting said electric signal output from said photoelectric converter to be synchronously detected with a frequency double the frequency of said wavelength modulation device;
   a DC amplifier for amplifying said electric signal from said photoelectric converter;
   a sampling circuit for sampling an output signal of said DC amplifier in synchronism with an oscillation frequency or double that frequency of said oscillation element and finding a full intensity of a spectrum which is superimposed on a greater background spectrum; and
   wavelength scanning mechanism driving means for rotating said diffraction grating, rotation angle detection means for detecting a rotation angle of said diffraction grating, and a control/processing circuit including input means, in which said control/processing circuit controls said wavelength scanning mechanism driving means based on a rotation angle detected from said rotation angle detection means in accordance with a measured wavelength entered from said input means;

wherein said control/processing circuit includes an external output device for receiving measured data from said sampling circuit and said synchronous detector to permit a supply of said measured data to said external output device; and said oscillation element is comprised of a U-shaped tuning fork driven by an electromagnetic coil;

said plane mirror is mounted on a free end of one oscillation section of said U-shaped tuning fork;

said amplitude measuring means comprises a light emission device for directing detection light for illumination, means for shutting off a portion of said detection light in accordance with the oscillation of said U-shaped tuning fork, and a light amount detector for receiving said detection light and detecting an amount of light received; and said oscillation element driving circuit controls excitation of said electromagnetic coil so that an amount of light measured by said light amount detector is made normally at a constant value.

2. A wavelength modulation derivative spectrometer according to claim 1, in which said light shutting-off means is comprised of a knife edge which is mounted on a free end of the other oscillation section of said U-shaped tuning fork.

3. A wavelength modulation derivative spectrometer according to claim 1, in which said light shutting-off means is one oscillation section of said U-shaped tuning fork.

4. A wavelength modulation derivative spectrometer for measuring a variation intensity of a spectrum superimposed onto a greater background spectrum, comprising:

a wavelength modulation device for oscillating light to be measured with a predetermined frequency comprising an oscillation element, a first plane mirror mounted on a first oscillation section of said oscillation element to permit a reflection of the light which is to be measured, an oscillation element driving circuit for permitting the light which is reflected from the first plane mirror to be oscillated with a predetermined frequency, and amplitude measuring means including a second plane mirror mounted on a second oscillation section of said oscillation element, for optically measuring an oscillation amplitude of the oscillated light, in which said oscillation element driving circuit drives said oscillation element so that an amplitude measured by said amplitude measuring means in response to detection light reflected from the second plane mirror is maintained normally at a constant level;

a diffraction grating for distributing that light modulated by the wavelength modulation device to produce a diffraction spectrum;

a photoelectric converter for receiving the diffraction spectrum from said diffraction grating and converting a light-modulated component contained in said diffraction spectrum to an electric signal; and a synchronous detector for permitting said electric signal output from said photoelectric converter to be synchronously detected with a frequency double the frequency of said wavelength modulation device;

wherein said oscillation element is comprised of a U-shaped tuning fork driven by an electromagnetic coil;

said first plane mirror is mounted on one oscillation section of said U-shaped tuning fork;

said amplitude measuring means comprises a light emission device for directing said detection light for illumination, means for shutting off a portion of said detection light in accordance with the oscillation of said U-shaped tuning fork, and a light amount detector for receiving said detection light to detect an amount of detection light received; and said oscillation element driving circuit controls excitation of said electromagnetic coil so that the amplitude of a variation measured from said amount of light is made normally at a constant level.

5. A wavelength modulation derivative spectrometer for measuring a variation intensity of a spectrum superimposed onto a greater background spectrum, comprising:

a wavelength modulation device for oscillating light to be measured with a predetermined frequency comprising an oscillation element, a first plane mirror mounted on a first oscilation section of said oscillation element to permit a reflection of the light which is to be measured, an oscillation element driving circuit for permitting the light which is reflected from the first plane mirror to be oscillated with a predetermined frequency, and amplitude measuring means including a second plane mirror mounted on a second oscillation section of said oscillation element, for optically measuring an oscillation amplitude of the oscillated light, in which said oscillation element driving circuit drives said oscillation element so that an amplitude measured by said amplitude measuring means in response to detection light reflected from the second plane mirror is maintained normally at a constant level;

a diffraction grating for distributing that light modulated by the wavelength modulation device to produce a diffraction spectrum;

a photoelectric converter for receiving the diffraction spectrum from said diffraction grating and converting a light-modulated component contained in said diffraction spectrum to an electric signal;

a synchronous detector for permitting said electric signal output from said photoelectric converter to be synchronously detected with a frequency double the frequency of said wavelength modulation device; and a wavelength scanning mechanism for continuously varying an angle of light incident to said diffraction grating by the rotation of said diffraction grating, said light being modulated by said wavelength modulation device;

wherein said oscillation element is a U-shaped tuning fork driven by an electromagnetic coil;

said first plane mirror is mounted on a free end of one oscillation section of said U-shaped tuning fork;

said amplitude measuring means comprises a light emission device for directing said detection light for illumination, means for shutting off a portion of said detection light in accordance with the oscillation of said U-shaped tuning fork, and a light amount detector for receiving said detection light to detect an amount of said detection light; and said oscillation element driving circuit controls excitation of said electromagnetic coil so that an amount of light detected by said light amount detector is made normally at a constant value.

6. A wavelength modulation derivative spectrometer for measuring a variation intensity of a spectrum superimposed onto a greater background spectrum, comprising:

a wavelength modulation device for oscillating light to be measured with a predetermined frequency comprising
an oscillation element,
a first plane mirror mounted on a first oscillation section of said oscillation element to permit a reflection of the light which is to be measured,
an oscillation element driving circuit for permitting the light which is reflected from the first plane mirror to be oscillated with a predetermined frequency, and
amplitude measuring means including a second plane mirror mounted on a second oscillation section of said oscillation element, for optically measuring an oscillation amplitude of the oscillated light, in which said oscillation element driving circuit drives said oscillation element so that an amplitude measured by said amplitude measuring means in response to detection light reflected from the second plane mirror is maintained normally at a constant level;

a diffraction grating for distributing that light modulated by the wavelength modulation device to produce a diffraction spectrum;

a photoelectric converter for receiving the diffraction spectrum from said diffraction grating and converting a light-modulated component contained in said diffraction spectrum to an electric signal;

a synchronous detector for permitting said electric signal output from said photoelectric converter to be synchronously detected with a frequency double the frequency of said wavelength modulation device;

a DC amplifier for amplifying said electric signal from said photoelectric converter, a sampling circuit for sampling an output signal of said DC amplifier in synchronism with an oscillation frequency or double that frequency of said oscillation element and finding a full intensity of a spectrum which is superimposed on a greater background spectrum; and wavelength scanning mechanism driving means for rotating said diffraction grating, rotation angle detection means for detecting a rotation angle of said diffraction grating, and a control/processing circuit including input means, in which said control/processing circuit controls said wavelength scanning mechanism driving means based on a rotation angle detected from said rotation angle detection means in accordance with a measured wavelength entered from said input means;

wherein said control/processing circuit further includes an external output device for receiving measured data from said sampling circuit and said synchronous detector to permit a supply of said measured data to said external output device; and said oscillation element is comprised of a U-shaped tuning fork driven by an electromagnetic coil;

said first plane mirror is mounted on a free end of one oscillation section of said U-shaped tuning fork;

said amplitude measuring means comprises a light emission device for directing detection light for illumination, means for shutting off a portion of said detection light in accordance with the oscillation of said U-shaped tuning fork, and a light amount detector for receiving said detection light and detecting an amount of light received; and said oscillation element driving circuit controls excitation of said electromagnetic coil so that an amount of light measured by said light amount detector is made normally at a constant value.

* * * * *